(12) United States Patent
Noh et al.

(10) Patent No.: US 8,811,287 B2
(45) Date of Patent: Aug. 19, 2014

(54) METHOD FOR TRANSMITTING A SOUNDING REFERENCE SIGNAL IN A WIRELESS COMMUNICATION SYSTEM, AND APPARATUS FOR SAME

(75) Inventors: Min Seok Noh, Anyang-si (KR); Jae Hoon Chung, Anyang-si (KR); Sung Ho Moon, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 13/497,190

(22) PCT Filed: Sep. 20, 2010

(86) PCT No.: PCT/KR2010/006474
§ 371 (c)(1),
(2), (4) Date: Mar. 26, 2012

(87) PCT Pub. No.: WO2011/034399
PCT Pub. Date: Mar. 24, 2011

(65) Prior Publication Data
US 2012/0182957 A1   Jul. 19, 2012

Related U.S. Application Data

(60) Provisional application No. 61/244,424, filed on Sep. 21, 2009, provisional application No. 61/326,634, filed on Apr. 21, 2010, provisional application No. 61/328,649, filed on Apr. 28, 2010.

(51) Int. Cl.
*H04Q 7/00* (2006.01)
*H04Q 7/24* (2006.01)

(52) U.S. Cl.
USPC .......................................... 370/328; 370/338

(58) Field of Classification Search
USPC .......................................... 370/328, 329, 338
See application file for complete search history.

(56) References Cited

U.S. PATENT DOCUMENTS

| 4,713,808 A | 12/1987 | Gaskill et al. |
| 7,349,375 B2 | 3/2008 | Gerakoulis |

(Continued)

FOREIGN PATENT DOCUMENTS

| CN | 101106395 A | 1/2008 |
| CN | 101330325 A | 12/2008 |

(Continued)

OTHER PUBLICATIONS

CMCC, "Related issues on PDDCH carrier indication," 3GPP TSG RAN WG1 meeting #58, R1-093268, Shenzhen, China, Aug. 24-28, 2009, XP050388112 (3 pages).

(Continued)

*Primary Examiner* — Hong Cho
(74) *Attorney, Agent, or Firm* — Birch, Stewart, Kolasch & Birch, LLP

(57) ABSTRACT

The present invention relates to a method in which user equipment transmits a non-periodic sounding reference signal in a wireless communication system. In detail, the method comprises: a step of receiving a downlink control channel from a base station; a step of checking carrier indication field (CIF) information of a downlink control information (DCI) format contained in the downlink control channel; and a step of transmitting a non-periodic sounding reference signal to the base station in accordance with the CIF information, wherein said CIF information comprises a triggering message of the non-period sounding reference signal.

10 Claims, 6 Drawing Sheets

(56) References Cited

U.S. PATENT DOCUMENTS

| | | | |
|---|---|---|---|
| 8,145,127 B2 | 3/2012 | Nory et al. | |
| 8,195,186 B2 | 6/2012 | Mitra et al. | |
| 8,351,347 B2 | 1/2013 | Noh et al. | |
| 8,391,234 B2 | 3/2013 | Nouda et al. | |
| 2006/0035643 A1 | 2/2006 | Vook et al. | |
| 2007/0230460 A1 | 10/2007 | Jeong et al. | |
| 2008/0045260 A1 | 2/2008 | Muharemovic et al. | |
| 2009/0034468 A1 | 2/2009 | Muharemovic et al. | |
| 2009/0042615 A1 | 2/2009 | Teo et al. | |
| 2009/0046800 A1 | 2/2009 | Xu et al. | |
| 2009/0054093 A1 | 2/2009 | Kim et al. | |
| 2009/0077444 A1 | 3/2009 | Qi et al. | |
| 2009/0088148 A1 | 4/2009 | Chung et al. | |
| 2009/0168714 A1 | 7/2009 | Tanaka et al. | |
| 2009/0181687 A1 | 7/2009 | Tiirola et al. | |
| 2009/0196249 A1 | 8/2009 | Kawamura et al. | |
| 2009/0213769 A1 | 8/2009 | Shen et al. | |
| 2009/0238121 A1 | 9/2009 | Kotecha | |
| 2009/0262695 A1* | 10/2009 | Chen et al. | 370/329 |
| 2009/0274076 A1 | 11/2009 | Muharemovic et al. | |
| 2009/0279447 A1 | 11/2009 | Mehta et al. | |
| 2009/0279459 A1 | 11/2009 | Muharemovic et al. | |
| 2010/0069028 A1 | 3/2010 | Choi et al. | |
| 2010/0080187 A1 | 4/2010 | Papasakellariou et al. | |
| 2010/0103902 A1 | 4/2010 | Kim et al. | |
| 2010/0238845 A1 | 9/2010 | Love et al. | |
| 2010/0246561 A1* | 9/2010 | Shin et al. | 370/345 |
| 2010/0303013 A1 | 12/2010 | Khandekar et al. | |
| 2011/0014909 A1 | 1/2011 | Han et al. | |
| 2011/0026478 A1 | 2/2011 | Lee et al. | |
| 2011/0038271 A1 | 2/2011 | Shin et al. | |
| 2011/0085457 A1 | 4/2011 | Chen et al. | |
| 2011/0090862 A1 | 4/2011 | Liang et al. | |
| 2011/0098054 A1 | 4/2011 | Gorokhov et al. | |
| 2011/0142095 A1 | 6/2011 | Guo et al. | |
| 2011/0261716 A1 | 10/2011 | Kim et al. | |
| 2011/0280206 A1 | 11/2011 | Johansson et al. | |
| 2012/0002568 A1 | 1/2012 | Tiirola et al. | |
| 2012/0044857 A1 | 2/2012 | Kim et al. | |
| 2012/0082124 A1 | 4/2012 | Kwon et al. | |
| 2012/0093119 A1 | 4/2012 | Kim et al. | |
| 2012/0178502 A1 | 7/2012 | Teo et al. | |
| 2012/0218967 A1 | 8/2012 | Noh et al. | |
| 2012/0281625 A1 | 11/2012 | Noh et al. | |
| 2013/0094448 A1 | 4/2013 | Noh et al. | |
| 2013/0215838 A1 | 8/2013 | Aiba et al. | |
| 2013/0294382 A1* | 11/2013 | XU et al. | 370/329 |

FOREIGN PATENT DOCUMENTS

| | | |
|---|---|---|
| EP | 1 916 782 A1 | 4/2008 |
| EP | 2023504 A2 | 2/2009 |
| EP | 2086266 A2 | 8/2009 |
| JP | 2009-60595 A | 3/2009 |
| JP | 2012-503406 A | 2/2012 |
| JP | 2012-521173 A | 9/2012 |
| KR | 10-2006-0096018 A | 9/2006 |
| KR | 10-2008-0093319 A | 10/2008 |
| KR | 10-2008-0096336 A | 10/2008 |
| KR | 10-2008-0112115 A | 12/2008 |
| KR | 10-2009-014978 A | 2/2009 |
| KR | 10-2009-0086031 A | 8/2009 |
| KR | 10-2009-0084752 A | 9/2009 |
| WO | WO 2008/101055 A2 | 8/2008 |
| WO | WO 2008/120925 A1 | 10/2008 |
| WO | WO 2008/166293 A | 12/2008 |
| WO | WO 2009/04600 A2 | 4/2009 |
| WO | WO 2009/088206 A2 | 7/2009 |
| WO | WO 2010/036053 A2 | 4/2010 |

OTHER PUBLICATIONS

Mitsubishi Electric, "UL sounding RS control signaling for antenna selection," 3GPP RAN1 #50bis, R1-073932, Shanghai, China, Oct. 8-12, 2007, XP050107490, pp. 1-9.

Samsung, "ACK/NAK repetitions in E-UTRA UL," 3GPP TSG RAN WG1 #53bis, R1-082303, Warsaw, Poland, Jun. 30-Jul. 4, 2008, XP050110611, pp. 1-5.

Samsung, "SRS transmission issues in LTE-A," 3GPP TSG RAN WG1 #57, R1-091879, San Francisco, USA, May 4-8, 2009, XP050339373, pp. 1-3.

Samsung, "SRS transmission issues in LTE-A," 3GPP TSG RAN WG1 #57bis, R1-092677, Los Angeles, USA, Jun. 29-Jul. 3, 2009, XP050351157, pp. 1-3.

Toskala et al., "Physical Layer," LTE for UMTS: OFDMA and SC-FDMA Based Radio Access, Chapter 5, Jun. 12, 2009, XP055051915, pp. 83-135.

Interdigital Communications, LLC, "Cross Carrier Operation for Bandwidth Extension," 3GPP TSG-RAN WG1 Meeting #58, R1-093067, Aug. 24-28, 2009, pp. 1-6.

Qualcomm Europe, "Confirmation of various UL transmission configurations," 3GPP TSG-RAN WG1 #54, R1-083174, Aug. 18-22, 2008, pp. 1-4.

Nextwave Wireless, IP Wireless, "UE Transmit Antenna Selection—Technical Aspects," 3GPP TSG RAN WG1 Meeting #55, R1-084432, Prague, Czech Republic, Nov. 10-14, 2008, (6 pages).

Nokia Siemens Networks, Nokia, "UL Sounding Reference Signal," 3GPP TSG RAN WG1 #49bis, R1-072988, Orlando, USA, Jun. 25-29, 2007, (5 pages).

Panasonic, "Sounding RS parameters," 3GPP TSG RAN WG1 Meeting #52bis, R1-081201, Shenzhen, China, Mar. 31-Apr. 4, 2008, pp. 1-7.

Samsung, "SRS Transmission Issues for LTE-A," 3GPP TSG RAN WG1 #55bis, R1-090100, Ljubljana, Slovenia, Jan. 14-18, 2009, pp. 1-3.

* cited by examiner

FIG. 2
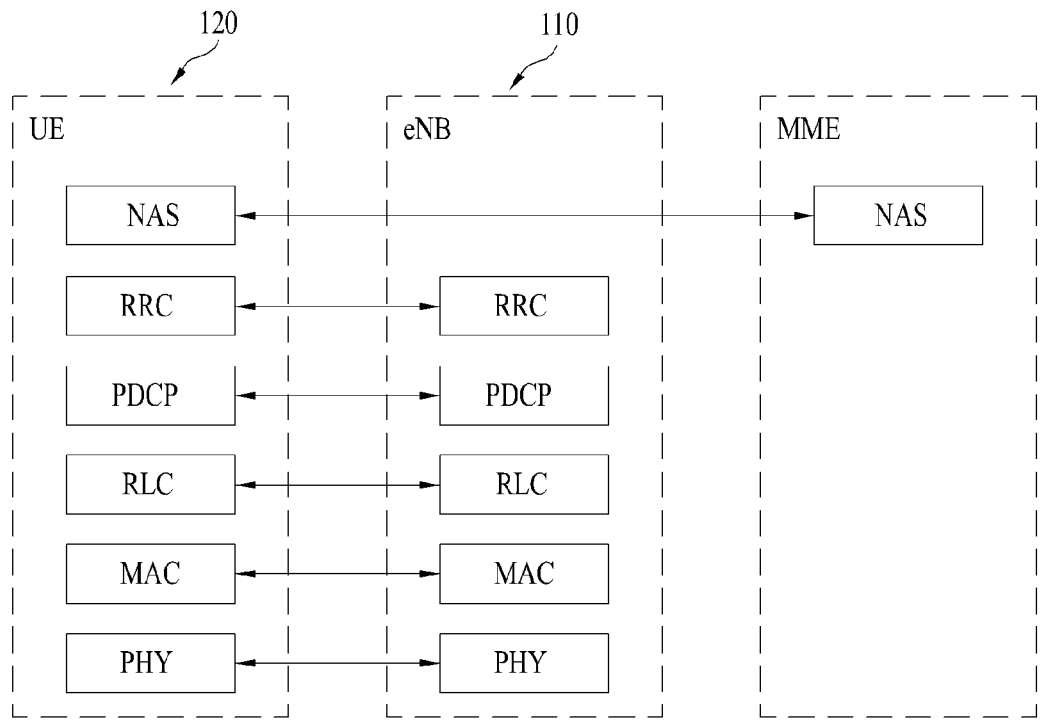
(a) CONTROL-PLANE PROTOCOL STACK
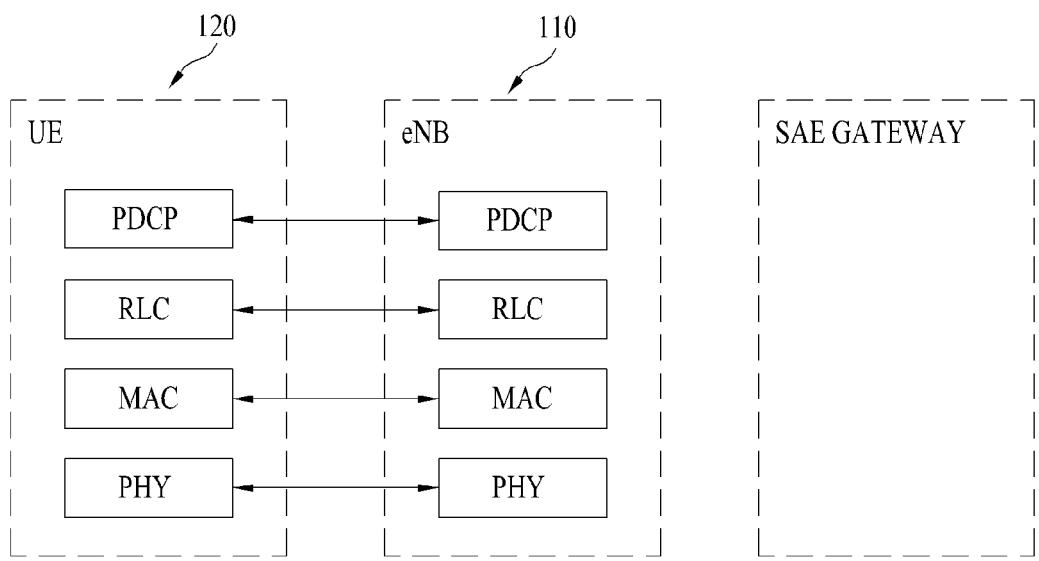
(b) USER-PLANE PROTOCOL STACK

METHOD FOR TRANSMITTING A SOUNDING REFERENCE SIGNAL IN A WIRELESS COMMUNICATION SYSTEM, AND APPARATUS FOR SAME

CROSS REFERENCE TO RELATED APPLICATIONS

This application is the National Phase of PCT/KR2010/006474 filed on Sep. 20, 2010, which claims priority under 35 U.S.C. §119(e) to U.S. Provisional Application Nos. 61/244,424 filed on Sep. 21, 2009, 61/326,634 filed on Apr. 21, 2010, and 61/328,649 filed on Apr. 28, 2010, all of which are hereby expressly incorporated by reference into the present application.

TECHNICAL FIELD

The present invention relates to a wireless communication system, and more particularly, to a method and apparatus for transmitting an aperiodic sounding reference signal from a user equipment to a base station in a wireless communication system.

BACKGROUND ART

As an example of a mobile communication system to which the present invention is applicable, a 3$^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3$^{rd}$ Generation Partnership Project; Technical Specification Group Radio Access Network".

Referring to FIG. 1, the E-UMTS mainly includes a User Equipment (UE) 120, base stations (or eNBs or eNode Bs) 110a and 110b, and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

Recently, the standardization of the subsequent technology of the LTE is ongoing in the 3GPP. In the present specification, the above-described technology is called "LTE-Advanced" or "LTE-A". The LTE system and the LTE-A system are different from each other in terms of system bandwidth. The LTE-A system aims to support a wide bandwidth of a maximum of 100 MHz. The LTE-A system uses carrier aggregation or bandwidth aggregation technology which achieves the wide bandwidth using a plurality of frequency blocks. The carrier aggregation enables the plurality of frequency blocks to be used as one large logical frequency band in order to use a wider frequency band. The bandwidth of each of the frequency blocks may be defined based on the bandwidth of a system block used in the LTE system. Each frequency block is transmitted using a component carrier.

DISCLOSURE

Technical Problem

An object of the present invention is to provide a method and apparatus for transmitting an aperiodic sounding reference signal from a user equipment to a base station in a wireless communication system.

The technical problems solved by the present invention are not limited to the above technical problems and those skilled in the art may understand other technical problems from the following description.

Technical Solution

The object of the present invention can be achieved by providing a method for transmitting an aperiodic sounding reference signal (SRS) at a user equipment in a wireless communication system including receiving downlink control information from a base station, checking carrier indication field (CIF) information of a downlink control information (DCI) format included in the downlink control information, and transmitting the aperiodic SRS to the base station according to the CIF information, wherein the CIF information includes a triggering message of the aperiodic SRS.

In another aspect of the present invention, there is provided a user equipment in a wireless communication system including a reception module configured to receive downlink control information from a base station, a processor configured to check carrier indication field (CIF) information of a downlink control information (DCI) format included in the downlink control information, and a transmission module configured to transmit an aperiodic SRS to the base station according to the CIF information, wherein the CIF information includes a triggering message of the aperiodic SRS.

The CIF information may include information about an index of an uplink component carrier for transmitting uplink data from the user equipment to the base station, and the information about the index of the uplink component carrier and the triggering message of the aperiodic SRS may be joint-coded. The number of uplink component carriers may be 3 and the size of the CIF information may be 3 bits.

The triggering message of the aperiodic SRS may be expressed by a most significant bit (MSB) or a least significant bit (LSB) of the CIF information.

Advantageous Effects

According to the embodiments of the present invention, it is possible to efficiently transmit an aperiodic sounding reference signal from a user equipment to a base station in a wireless communication system.

The effects of the present invention are not limited to the above-described effects and other effects which are not described herein will become apparent to those skilled in the art from the following description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

BEST MODE

Figure 1:
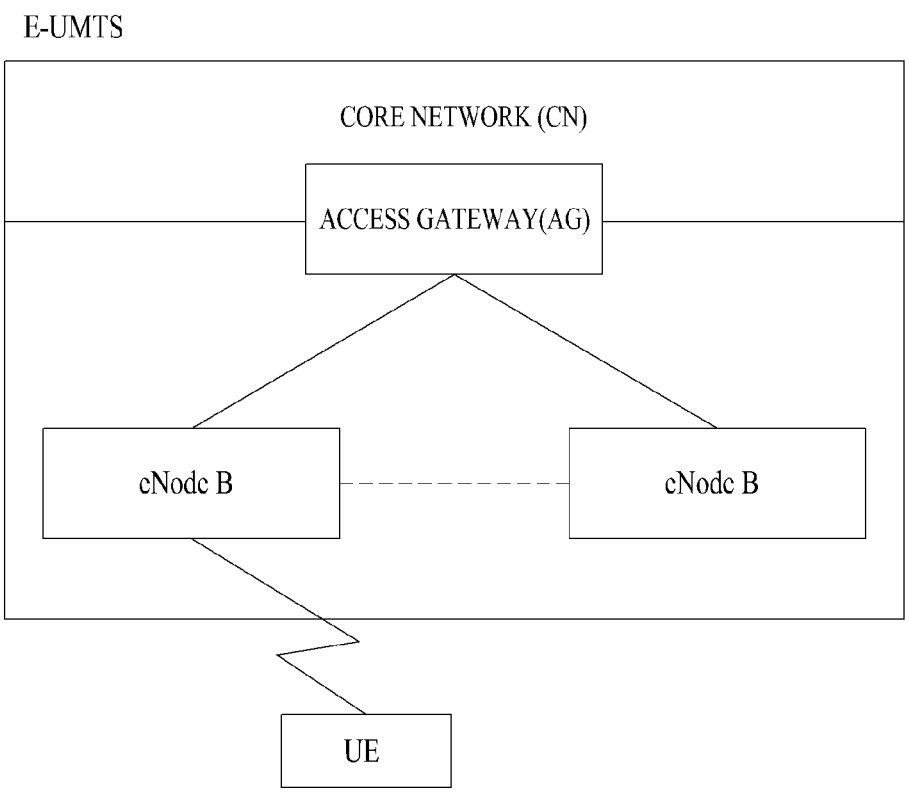
FIG. 1 is a diagram showing a network structure of an Evolved Universal Mobile Telecommunications System (E-UMTS) as an example of a mobile communication system.

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Hereinafter, a system in which a system band uses a single frequency block is referred to as a legacy system or a narrowband system. A system in which a system band includes a plurality of frequency blocks and at least one frequency blocks are used as a system block of a legacy system is referred to as an evolved system or a wideband system. The frequency block used as the legacy system block has the same size as the system block of the legacy system. The sizes of the remaining frequency blocks are not specially limited. However, in order to simplify a system, the size of the remaining frequency blocks may be determined based on the size of the system block of the legacy system. For example, a 3GPP LTE system and a 3GPP LTE-A system are evolved from a legacy system.

Based on the above definition, in the present specification, a 3GPP LTE system is called an LTE system or a legacy system. A user equipment (UE) which supports an LTE system is called an LTE UE or a legacy UE. A 3GPP LTE-A system is called an LTE-A system or an evolved system. A UE which supports an LTE-A system is called an LTE-A UE or an evolved UE.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, reconfiguration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
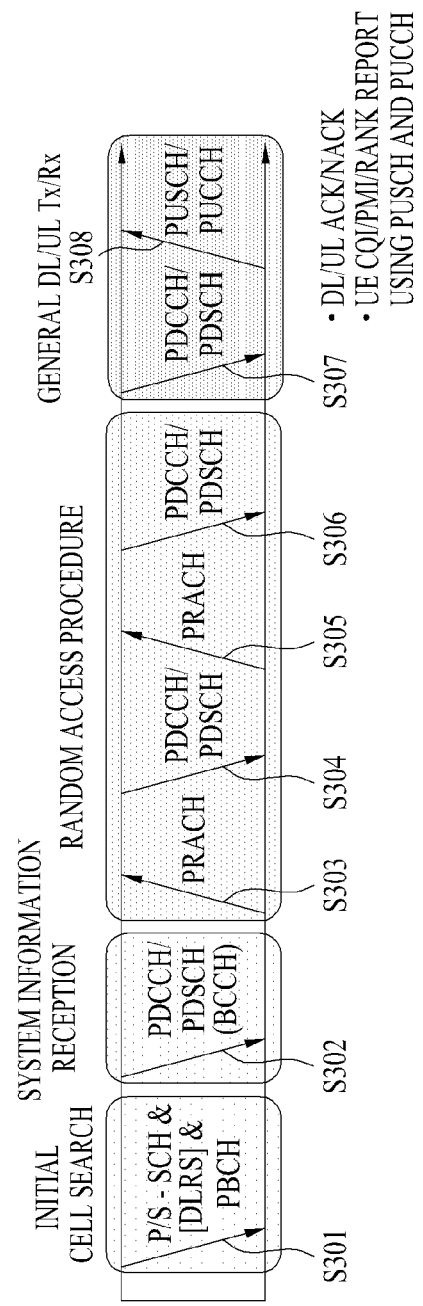
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
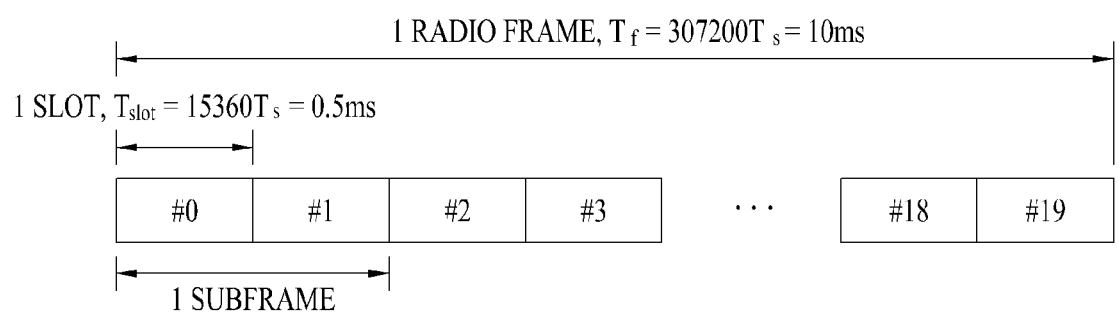
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \cdot T_s$) and includes 10 subframes with the same size. Each of the subframes has a length of 1 ms and includes two slots. Each of the slots has a length of 0.5 ms ($15360 \cdot T_s$). $T_s$ denotes a sampling time, and is represented by $T_s=1/(15 \text{ kHz} \times 2048)=3.2552 \times 10^{-8}$ (about 33 ns). Each slot includes a plurality of OFDM or SC-FDMA symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
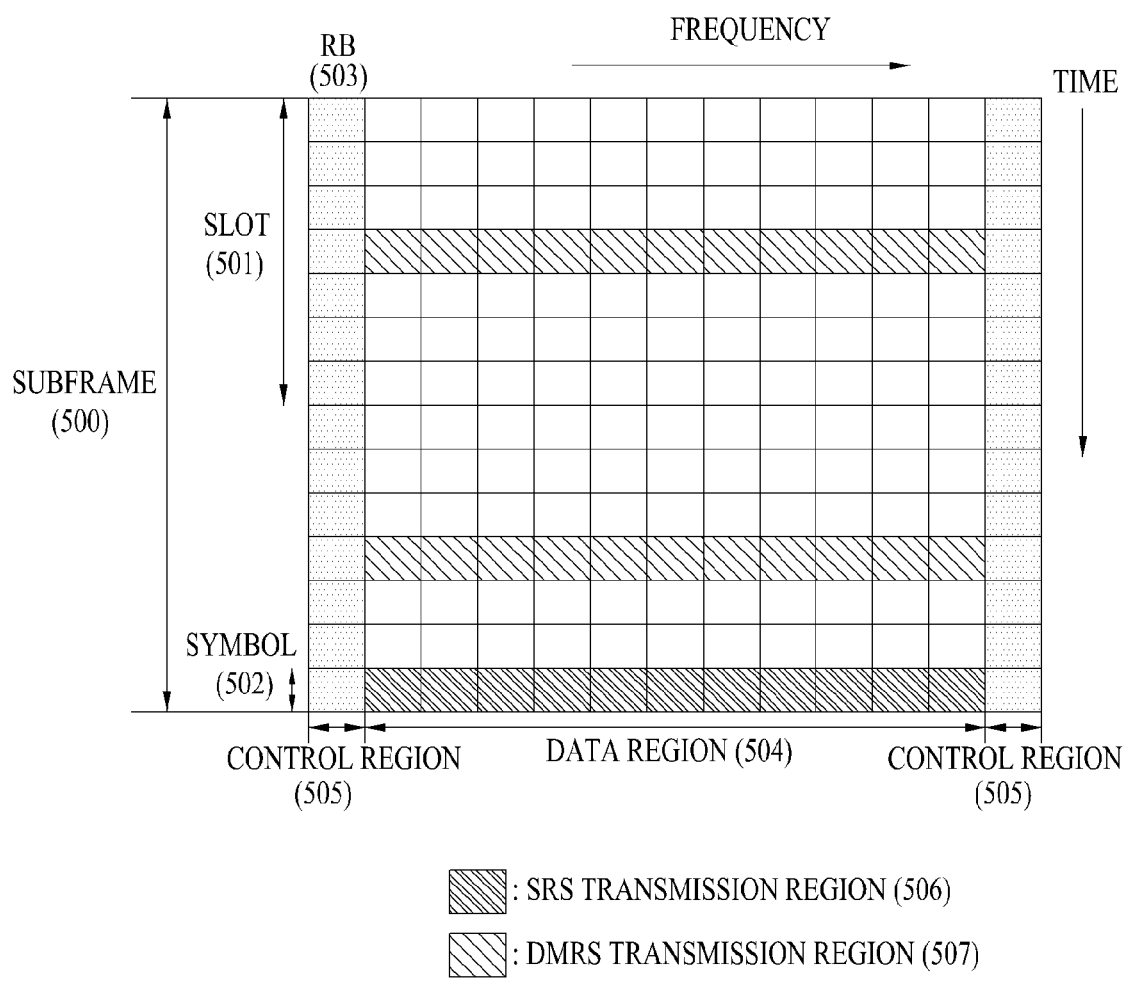
FIG. 5 is a diagram showing the structure of an uplink subframe in an LTE system.

FIG. 5 is a diagram showing the structure of an uplink subframe in an LTE system.

Referring to FIG. 5, a subframe 500 having a length of 1 ms, which is a basic unit of LTE uplink transmission, includes two slots 501 each having a length of 0.5 ms. In case of normal cyclic prefix (CP), each slot includes seven symbols 502 and one symbol corresponds to one SC-FDMA symbol. An RB 503 is a resource allocation unit corresponding to 12 subcarriers in a frequency domain and one slot in a time domain. The structure of the uplink subframe of the LTE is roughly divided into a data region 504 and a control region 505. The data region refers to a series of communication resources used to transmit data such as voice or packets to each UE and corresponds to resources excluding resources belonging to the control region in a subframe. The control region refers to a series of communication resources used to transmit a downlink channel quality report from each UE, reception ACK/NACK for a downlink signal, an uplink scheduling request, etc.

As shown in FIG. 5, a region 506 for transmitting a sounding reference signal (SRS) within one subframe is a part including SC-FDMA symbols located at the last of a time axis in one subframe and the SRS is transmitted via a data transmission band on a frequency axis. SRSs of several UEs transmitted using the last SC-FDMA symbols of the same subframe may be distinguished according to frequency positions.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values $\alpha$ according to Equation 1.

$$\alpha = 2\pi \frac{n_{SRS}^{cs}}{8} \qquad \text{Equation 1}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated to the frequency according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 2.

$$a_{2k+k_0,l} = \begin{cases} \beta_{SRS} r^{SRS}(k) & k=0, 1, \ldots, M_{sc,b}^{RS}-1 \\ 0 & \text{otherwise} \end{cases} \qquad \text{Equation 2}$$

where, $k_0$ denotes a frequency domain start point of an SRS and is defined by Equation 3.

$$k_0 = k'_0 + \sum_{b=0}^{B_{SRS}} 2M_{sc,b}^{RS} n_b \qquad \text{Equation 3}$$

where, $n_b$ denotes a frequency position index. $k'_0$ for a general uplink subframe is defined by Equation 4 and $k'_0$ for an uplink pilot time UpPTS is defined by Equation 5.

$$k'_0 = (\lfloor N_{RB}^{UL}/2 \rfloor - m_{SRS,0}/2)N_{SC}^{RB} + k_{TC} \quad \text{Equation 4}$$

$$k'_0 = \begin{cases} (N_{RB}^{UL} - m_{SRS,0}^{max})N_{sc}^{RB} + k_{TC} & \text{if}((n_f \bmod 2) \times (2 - N_{SP}) + n_{hf}) \bmod 2 = 0 \\ k_{TC} & \text{otherwise} \end{cases} \quad \text{Equation 5}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 in an uplink pilot slot of a second half frame. $M_{sc,b}^{RS}$ is the length, that is, the bandwidth, if the SRS sequence expressed in subcarrier units defined by Equation 6.

$$M_{sc,b}^{RS} = m_{SRS,b} N_{sc}^{RB}/2 \quad \text{Equation 6}$$

In Equation 6, $m_{SRS,b}$ is a value signaled from an eNB according to an uplink bandwidth $N_{RB}^{UL}$ as shown in Tables 1 to 4.

In order to acquire $m_{SRS,b}$, a cell-specific parameter $C_{SRS}$ having an integer value of 0 to 7 and a UE-specific parameter $B_{SRS}$ having an integer value of 0 to 3 are necessary. The values of $C_{SRS}$ and $B_{SRS}$ are provided by a higher layer.

TABLE 1

$b_{hop} = 0, 1, 2, 3$ and $6 \leq N_{RB}^{UL} \leq 40$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop} = 0, 1, 2, 3$ and $40 < N_{RB}^{UL} \leq 60$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop} = 0, 1, 2, 3$ and $60 < N_{RB}^{UL} \leq 80$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop} = 0, 1, 2, 3$ and $80 < N_{RB}^{UL} \leq 110$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As described above, the UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is deactivated, that is, if $b_{hop} \geq B_{SRS}$, a frequency position index $n_b$ has a constant value as shown in Equation 7. Here, $n_{RRC}$ is a parameter received from a higher layer.

$$n_b = \lfloor 4n_{RRC}/m_{SRS,b} \rfloor \bmod N_b \quad \text{Equation 7}$$

Meanwhile, if frequency hopping of the SRS is activated, that is, $b_{hop} < B_{SRS}$, a frequency position index $n_b$ is defined by Equations 8 and 9.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{Equation 8}$$

$$F_b(n_{SRS}) = \begin{cases} (N_b/2) \frac{\left\lfloor \frac{n_{SRS}}{\prod_{b'=b_{hop}}^{b-1} N_{b'}} \right\rfloor}{\prod_{b'=b_{hop}}^{b-1} N_{b'}} + \frac{\left\lfloor \frac{n_{SRS}}{\prod_{b'=b_{hop}}^{b} N_{b'}} \right\rfloor}{2 \prod_{b'=b_{hop}}^{b-1} N_{b'}} & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad \text{Equation 9}$$

where, $n_{SRS}$ is a parameter used to calculate the number of times of transmission of the SRS and is defined by Equation 10.

$$n_{SRS} = \begin{cases} 2N_{SP}n_f + 2(N_{SP} - 1)\lfloor \frac{n_s}{10} \rfloor + \lfloor \frac{T_{offset}}{T_{offset\_max}} \rfloor, & \text{for 2ms SRS periodicity of TDD frame structure} \\ \lfloor (n_f \times 10 + \lfloor n_s/2 \rfloor)/T_{SRS} \rfloor, & \text{otherwise} \end{cases} \quad \text{Equation 10}$$

In Equation 10, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Tables 5 and 6 according to FDD and TDD. In particular, Table 5 shows the SRS configuration index for FDD and Table 6 shows the SRS configuration index for TDD.

TABLE 5

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}-2$ |

TABLE 5-continued

| SRS Configuration Index $I_{SRS}$ | SRS Periodicity $T_{SRS}$ (ms) | SRS Subframe Offset $T_{offset}$ |
|---|---|---|
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 6

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | ISRS-10 |
| 15-24 | 10 | ISRS-15 |
| 25-44 | 20 | ISRS-25 |
| 45-84 | 40 | ISRS-45 |
| 85-164 | 80 | ISRS-85 |
| 165-324 | 160 | ISRS-165 |
| 325-644 | 320 | ISRS-325 |
| 645-1023 | reserved | reserved |

As described above, the UE receives parameters from the eNB through RRC signaling and transmits a periodic SRS. The eNB instructs the UE to transmit an aperiodic SRS and the UE transmits the aperiodic SRS to the eNB according to the instruction.

The present invention relates to a method of transmitting control signaling through a physical layer for an aperiodic SRS using carrier indication field (CIF) bits included in a downlink control information (DCI) format (DCI format 0, a DCI format which may be newly defined in an LTE-A system or a DCI format used as downlink grant) of a dynamically transmitted PDCCH, that is, a method of including a triggering message for transmission of an aperiodic SRS in 3 CIF bits, as a method of instructing a UE to transmit an aperiodic SRS.

Since the number of component carriers supportable in uplink of Rel-10 is 3, eight states may be defined using 3 bits, and a message indicating transmission of an aperiodic SRS may be transmitted using a state, which is not used to indicate uplink component carriers, among the eight states, which will now be described in greater detail.

First, in order to support a maximum of three uplink component carriers, a method of joint-coding state information indicating uplink component carrier indexes and state information representing a triggering message for transmission of an aperiodic SRS and transmitting the information using CIF bits may be considered.

That is, three cases indicating uplink component carrier indexes and state information representing the triggering message for transmission of the aperiodic SRS are expressed by 6 cases through joint coding and the remaining state information of eight pieces of state information may be set to define special cases. Alternatively, a method of defining eight states through joint coding of all state information including special cases may be considered.

Examples of the special cases include a triggering message for transmission of an aperiodic SRS through all uplink component carriers set in a user equipment (UE) or all activated uplink component carriers, a triggering message for transmission of only an aperiodic SRS without indicating uplink component carriers or a message for identifying that parameters for an aperiodic SRS are included.

The triggering message may indicate that transmission of an aperiodic SRS through a component carrier is performed or indicate that transmission of an aperiodic SRS through a plurality of component carriers is performed. As a method of indicating the plurality of component carriers, a method of explicitly or implicitly signaling a plurality of component carriers is possible. For example, a method of signaling consecutive component carrier indexes or a method of signaling a plurality of component carriers using an offset value based on a specific component carrier index may be considered.

Table 7 shows an example of state information which may be expressed by the above-described CIF bits.

TABLE 7

| State | UL component carrier index for PUSCH | Aperiodic sounding triggering indication |
|---|---|---|
| 0 | Reserved | Reserved |
| 1 | UL component carrier logical or physical index 0 | Yes |
| 2 | UL component carrier logical or physical index 1 | Yes |
| 3 | UL component carrier logical or physical index 2 | Yes |
| 4 | UL component carrier logical or physical index 0 | No |
| 5 | UL component carrier logical or physical index 1 | No |
| 6 | UL component carrier logical or physical index 2 | No |
| 7 | Reserved | Reserved |

In Table 7, state information indexes 1 to 3 indicate a triggering message of an aperiodic SRS and indexes of uplink component carriers for transmitting the same. In addition, state information indexes 4 to 6 indicate indexes of uplink component carriers for transmitting a PUSCH without a triggering message of an aperiodic SRS.

Table 8 shows an example of defining all eight pieces of state information including an indication for triggering an aperiodic SRS and reconfiguration of an aperiodic SRS and a triggering message of an aperiodic SRS through all uplink component carriers.

TABLE 8

| State | UL component carrier index for PUSCH | Aperiodic sounding triggering indication |
|---|---|---|
| 0 | All of component carrier | Yes |
| 1 | UL component carrier logical or physical index 0 | Yes |
| 2 | UL component carrier logical or physical index 1 | Yes |
| 3 | UL component carrier logical or physical index 2 | Yes |
| 4 | UL component carrier logical or physical index 0 | No |
| 5 | UL component carrier logical or physical index 1 | No |
| 6 | UL component carrier logical or physical index 2 | No |
| 7 | Reconfiguration | Yes |

The reconfiguration of the aperiodic SRS means that parameters for the aperiodic SRS are indicated by a DCI format and indicates that information included in the DCI format is not grant for transmission of uplink data, but is parameters for transmitting the aperiodic SRS.

The parameters for transmission of the aperiodic SRS may be all cell-specific or UE-specific parameters similarly to a periodic SRS. A method of newly configuring parameters for the aperiodic SRS through RRC or parameters for the periodic SRS configured through RRC with respect to cell-specific parameters and including UE-specific parameters in a DCI format may be considered. Alternatively, a method of including specific parameters in a DCI format may be considered.

As another embodiment, as shown in Tables 9 and 10, 1 bit among 3 CIF bits may be used as an interpretation bit indicating whether or not an aperiodic SRS is transmitted and the remaining 2 bits are used to represent uplink component carriers. That is, a most significant bit (MSB) or a least significant bit (LSB) among the CIF bits may be used to indicate whether or not an aperiodic SRS is transmitted.

TABLE 9

| CIF value | UL component carrier index for PUSCH | Aperiodic sounding triggering indication |
|---|---|---|
| 000 | Reserved | Yes |
| 001 | UL component carrier logical or physical index 0 | Yes |
| 010 | UL component carrier logical or physical index 1 | Yes |
| 011 | UL component carrier logical or physical index 2 | Yes |
| 100 | Reserved | No |
| 101 | UL component carrier logical or physical index 0 | No |
| 110 | UL component carrier logical or physical index 1 | No |
| 111 | UL component carrier logical or physical index 2 | No |

TABLE 10

| CIF value | UL component carrier index for PUSCH | Aperiodic sounding triggering indication |
|---|---|---|
| 000 | All of component carrier | Yes |
| 001 | UL component carrier logical or physical index 0 | Yes |
| 010 | UL component carrier logical or physical index 1 | Yes |
| 011 | UL component carrier logical or physical index 2 | Yes |
| 100 | Reconfiguration | No |
| 101 | UL component carrier logical or physical index 0 | No |
| 110 | UL component carrier logical or physical index 1 | No |
| 111 | UL component carrier logical or physical index 2 | Yes |

In Tables 9 and 10, the MSB is an interpretation bit indicating whether or not the aperiodic SRS is transmitted. An uplink component carrier index 0 is indicated if the remaining 2 bits are 01, an uplink component carrier index 1 is indicated if the remaining 2 bits are 10, and an uplink component carrier index 2 is indicated if the remaining 2 bits are 11.

Although a method of transmitting a triggering message for an aperiodic SRS using CIF bits in DCI format 0 used for uplink is described in the present invention, the present invention is applicable to a DCI format other than DCI format 0, or a DCI format which is newly defined in an LTE-A system, and a DCI format used for downlink.

Figure 6:
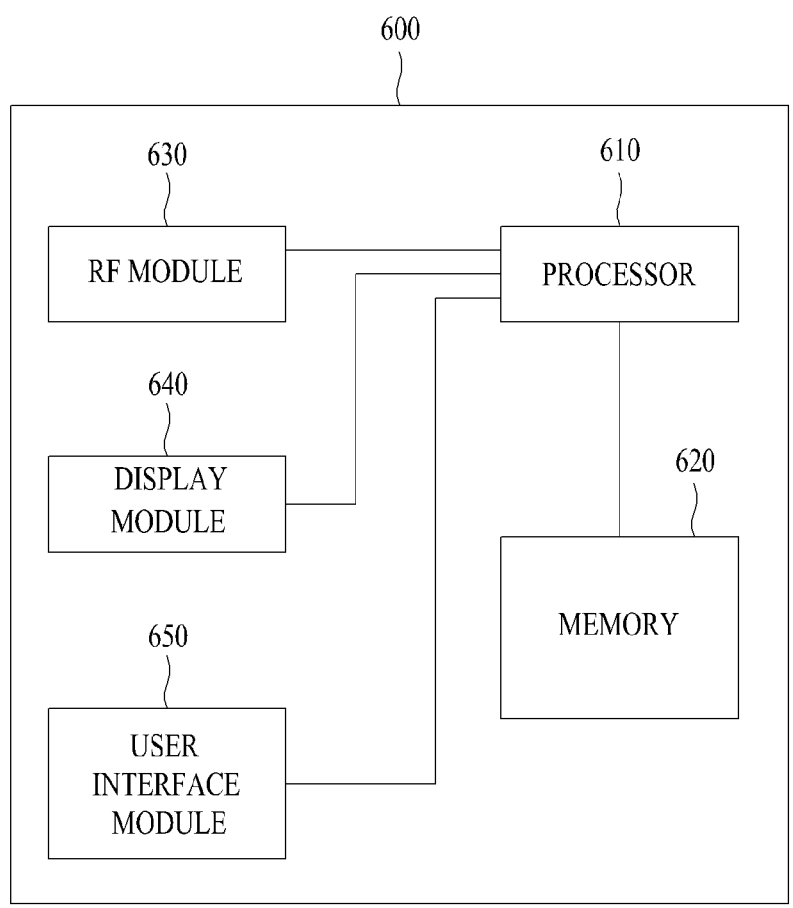
FIG. 6 is a block diagram showing a transmitter or receiver according to an embodiment of the present invention.

FIG. 6 is a block diagram showing a transmitter or receiver according to an embodiment of the present invention. The transmitter or receiver may be a part of an eNB or a UE.

Referring to FIG. 6, a transmitter/receiver 600 includes a processor 610, a memory 620, a Radio Frequency (RF) module 630, a display module 640 and a user interface module 650.

The transmitter/receiver 600 is shown for convenience of description and some modules thereof may be omitted. In addition, the transmitter/receiver 600 may further include necessary modules. In addition, some modules of the transmitter/receiver 600 may be subdivided. The processor 610 is configured to perform an operation of the embodiment of the present invention described with respect to the drawings.

More specifically, if the transmitter/receiver 600 is a part of an eNB, the processor 610 may perform a function for generating a control signal and mapping the control signal to a control channel set within a plurality of frequency blocks. If the transmitter/receiver 600 is a part of a UE, the processor 610 may confirm a control channel indicated thereto from a signal received through a plurality of frequency blocks and extract a control signal therefrom.

Thereafter, the processor 610 may perform a necessary operation based on the control signal. For a detailed description of the operation of the processor 610, reference may be made to the description associated with FIGS. 1 to 5.

The memory 620 is connected to the processor 610 so as to store an operating system, an application, program code, data and the like. The RF module 630 is connected to the processor 610 so as to perform a function for converting a baseband signal into a radio signal or converting a radio signal into a baseband signal. The RF module 630 performs analog conversion, amplification, filtering and frequency up-conversion or inverse processes thereof. The display module 640 is connected to the processor 610 so as to display a variety of information. As the display module 640, although not limited thereto, a well-known device such as a Liquid Crystal Display (LCD), a Light Emitting Diode (LED), or an Organic Light Emitting Diode (OLED) may be used. The user interface module 650 is connected to the processor 610 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "terminal" may also be replaced with the term user equipment (UE), subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication system and, more particularly, to a method and apparatus for transmitting an aperiodic sounding reference signal in a wireless communication system to which carrier aggregation is applied.

The invention claimed is:

1. A method for transmitting an aperiodic sounding reference signal (SRS) at a user equipment in a wireless communication system, the method comprising:
   configuring parameters for the aperiodic SRS by a radio resource control (RRC) layer;
   receiving downlink control information (DCI) from a base station;
   checking carrier indication field (CIF) information of a DCI format included in the downlink control information; and
   transmitting the aperiodic SRS to the base station according to the CIF information,
   wherein the CIF information includes a triggering message of the aperiodic SRS,
   wherein the CIF information includes an indicator to indicate whether the parameters for the aperiodic SRS are reconfigured or not, and
   wherein the DCI includes information on the reconfigured parameters for the aperiodic SRS if the indicator indicates that the parameters for the aperiodic SRS are reconfigured.

2. The method according to claim 1, wherein the CIF information includes information about an index of an uplink component carrier for transmitting uplink data from the user equipment to the base station.

3. The method according to claim 2, wherein the information about the index of the uplink component carrier and the triggering message of the aperiodic SRS are joint-coded.

4. The method according to claim 1, wherein the triggering message of the aperiodic SRS is expressed by a most significant bit (MSB) or a least significant bit (LSB) of the CIF information.

5. The method according to claim 1, wherein, if the indicator indicates that the parameters for the aperiodic SRS are reconfigured, information for transmitting uplink data is excluded from the DCI.

6. A user equipment in a wireless communication system, comprising:
   a reception module configured to receive downlink control information (DCI) from a base station;
   a processor configured to check carrier indication field (CIF) information of a DCI format included in the downlink control information; and
   a transmission module configured to transmit an aperiodic SRS to the base station according to the CIF information,
   wherein the CIF information includes a triggering message of the aperiodic SRS,
   wherein parameters for the aperiodic SRS are configured by a radio resource control (RRC) layer,
   wherein the CIF information includes a indicator to indicate whether the parameters for the aperiodic SRS are reconfigured or not, and
   wherein the DCI includes information on the reconfigured parameters for the aperiodic SRS if the indicator indicates that the parameters for the aperiodic SRS are reconfigured.

7. The user equipment according to claim 6, wherein the CIF information includes information about an index of an uplink component carrier for transmitting uplink data from the user equipment to the base station.

8. The user equipment according to claim 7, wherein the information about the index of the uplink component carrier and the triggering message of the aperiodic SRS are joint-coded.

9. The user equipment according to claim 6, wherein the triggering message of the aperiodic SRS is expressed by a most significant bit (MSB) or a least significant bit (LSB) of the CIF information.

10. The user equipment according to claim 6, wherein, if the indicator indicates that the parameters for the aperiodic SRS are reconfigured, information for transmitting uplink data is excluded from the DCI.

* * * * *